United States Patent [19]
Goeke

[11] 3,866,495
[45] Feb. 18, 1975

[54] METHOD AND APPARATUS FOR SHAVING ELONGATED WORKPIECES

[75] Inventor: Alfons Goeke, Solingen, Germany

[73] Assignee: Th. Kieserling & Albrecht, Solingen, Germany

[22] Filed: Aug. 8, 1972

[21] Appl. No.: 278,861

[52] U.S. Cl. .................... 82/1 C, 82/20, 82/29 A
[51] Int. Cl. ......................... B23b 5/08, B23b 1/00
[58] Field of Search .............. 82/2 E, 1 C, 20, 29 A

[56] References Cited
UNITED STATES PATENTS

| | | | |
|---|---|---|---|
| 2,451,147 | 10/1948 | Beachler | 82/29 A |
| 3,038,361 | 6/1962 | Holzer | 82/20 |
| 3,099,929 | 8/1963 | Lindemann | 82/20 |
| 3,190,156 | 6/1965 | Schuman | 82/29 A |

*Primary Examiner*—Leonidas Vlachos
*Attorney, Agent, or Firm*—Michael S. Striker

[57] ABSTRACT

Metallic wire, tubes, rods or similar workpieces are shaved by moving only lengthwise through the space within an annulus of adjustable knives which are orbited at a relatively high initial speed and are thereupon gradually decelerated to a relatively low operating speed. The speed of lengthwise movement of workpieces is gradually increased so that the sum of vectors representing the orbital speed of the knives and the speed of the workpieces remains unchanged. The vector representing the sum of vectors is indicative of the cutting speed; such vector extends substantially radially of a moving workpiece when the knives orbit at the initial speed and substantially axially of the moving workpiece when the knives orbit at the operating speed. The knives are provided with concave cutting edges and are caused to turn relative to their holder during adjustment to move the cutting edges closer to or further away from the axis of a workpiece which is being shaved.

11 Claims, 8 Drawing Figures

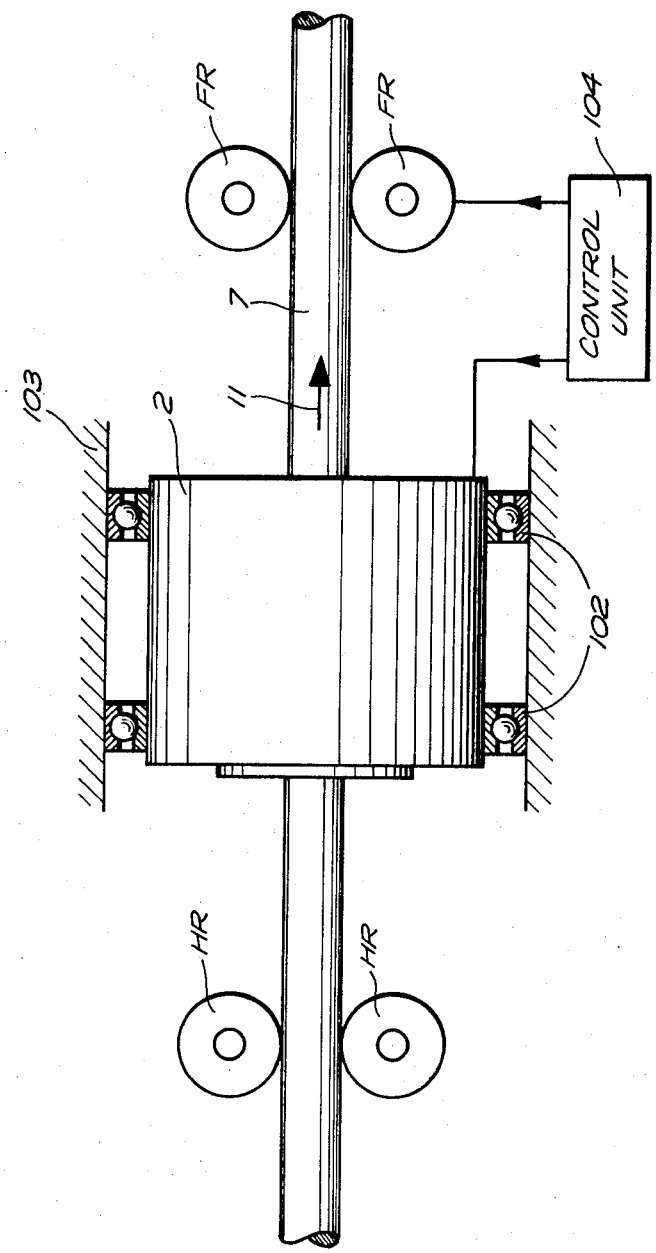

METHOD AND APPARATUS FOR SHAVING ELONGATED WORKPIECES

BACKGROUND OF THE INVENTION

The present invention relates to a method and apparatus for shaving elongated workpieces of generally circular profile, especially for shaving metallic wire, rods or tubes. More particularly, the invention relates to improvements in a method and apparatus for shaving workpieces by means of knives which orbit with a rotary holder while the workpiece moves lengthwise and is preferably held against rotation about its axis.

German printed publication No. 1,269,984 discloses a shaving apparatus wherein a metallic wire or rod is moved axially through a space defined by the circumferentially complete cutting edge of a stationary knife. The cutting edge serves to clean and/or to remove material along the external surface of a moving workpiece which is held against rotation about its axis. A drawback of such apparatus is that the cutting speed (which equals the speed of lengthwise movement of the workpiece) must be rapidly increased from zero to nominal speed when the workpiece is accelerated from zero speed to normal or operating speed. This generates extremely high cutting pressures which can cause rapid dulling as well as breakage of the cutting edge. Another drawback of such shaving apparatus is that the knife must be replaced at frequent intervals, namely, in response to minimal wear of the cutting edge, especially when the diameter of the treated workpiece is to equal or can deviate only slightly from a predetermined diameter. This is due to the fact that the circumferentially complete cutting edge must be provided on a one-piece knife. For the same reason, the knife must be replaced when the apparatus is to be converted from shaving of smaller-diameter workpieces to shaving of larger-diameter workpieces or vice versa.

SUMMARY OF THE INVENTION

An object of the invention is to provide a method of shaving workpieces of generally circular profile according to which the cutting speed remains unchanged irrespective of changes in the speed of lengthwise movement of workpieces.

Another object of the invention is to provide a novel and improved method of shaving wire, rods, tubes and analogous workpieces during acceleration of workpieces from zero speed to maximum speed.

An additional object of the invention is to provide a shaving apparatus which can be utilized for the practice of the above outlined method and which can shave smaller- or larger-diameter workpieces without necessitating a replacement of its material removing means.

A further object of the invention is to provide a shaving apparatus which can be rapidly and accurately adjusted to compensate for wear on its material removing means or to convert it for treatment of workpieces having diameters which are smaller or larger than the diameters of previously treated workpieces, which protects its material removing means from excessive stresses during starting, and which is capable of shaving workpieces at a high rate of speed.

The method of the present invention can be resorted to for shaving of workpieces having a generally circular profile, such as metallic wire, rods or tubes, by means of an annulus of preferably equidistant knives which orbit in a predetermined plane about a predetermined axis. The method comprises the steps of orbiting the knives at a relatively high initial speed and feeding a workpiece lengthwise in the direction of the predetermined axis so that the rapidly orbiting knives remove material at the external surface of the moving workpiece at a predetermined cutting speed whose vector is the sum of vectors representing the speed of orbital movement of the knives and the speed of lengthwise movement of the workpiece, gradually reducing the initial speed of the orbiting knives to a predetermined relatively low operating speed, and simultaneously gradually increasing the speed of movement of the workpiece so that the cutting speed remains unchanged during gradual reduction of the initial speed to the operating speed. The method preferably further comprises the step of holding the workpiece against rotation during lengthwise feeding.

The vector representing the sum of the two vectors preferably extends substantially radially of the workpiece while the knives orbit at the initial speed and substantially axially of the workpiece while the knives orbit at the operating speed.

The width of shavings which are removed by the orbiting knives increases during the reduction of their speed to the operating speed. At the operating speed, the width of shavings preferably equals the length of cutting edges of the knives.

The novel features which are considered as characteristic of the invention are set forth in particular in the appended claims. The improved shaving apparatus itself, however, both as to its construction and it mode of operation, together with additional features and advantages thereof, will be best understood upon perusal of the following detailed description of certain specific embodiments with reference to the accompanying drawing.

BRIEF DESCRIPTION OF THE DRAWING

FIG. 7 is a diagrammatic view of the entire shaving apparatus; and

DESCRIPTION OF THE PREFERRED EMBODIMENTS

Figure 1:
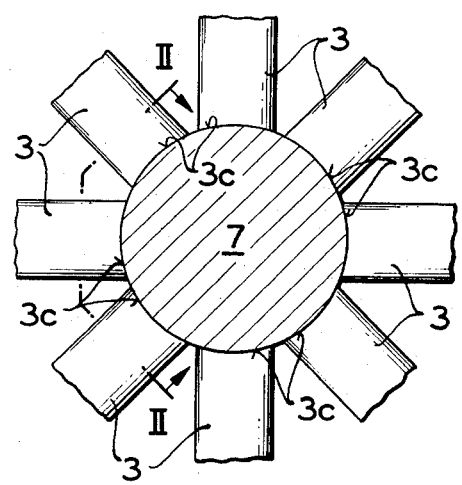
FIG. 1 is a transverse sectional view of a rod-shaped workpiece and a fragmentary side elevational view of an annulus of knives in angular positions they assume during shaving of a workpiece having an average diameter.

Referring first to FIGS. 1 and 5–7, the shaving apparatus comprises a rotary cylindrical holder 2 including a removable housing 1 which supports eight equidistant knives 3. The holder 2 is rotatable in antifriction bearings 102 which are mounted in a frame 103 and can be rotated at an infinite number of speeds by a control unit 104 whose details tails form no part of the present invention. An elongated metallic workpiece 7, e.g., a solid metallic rod, can be fed lengthwise by a plurality of feed rolls FR which are also driven at a plurality of speeds by the control unit 104. The arrow 11 indicates the direction of lengthwise movement of the workpiece 7 whereby the axis of the workpiece coincides with the axis about which the knives 3 orbit with the holder 2. The apparatus further comprises several holding rolls HR which hold the workpiece 7 against angular movement about its own axis during lengthwise movement in the direction indicated by the arrow 11.

Each of the knives 3 is not only movable radially of the axis of rotation of the holder 2 but is also turnable about its own axis which is at least substantially radial to the axis of the workpiece 7. Each knife 3 is provided with a substantially semispherical follower portion 3a which is remote from the axis of the holder 2 and has a convex surface abutting against the conical internal surface 4a of an axially movable adjusting ring 4 which is received in an internal cylindrical groove 2a of the holder 2. The knives 3 are movable radially and turnable in the aforementioned housing 1 which is bolted to the major portion of the holder 2. The means for moving the adjusting ring 4 axially in order to change the axial positions of the knives 3 includes a set of equidistant axially parallel motion transmitting push-pull rods 5 (only one shown in FIG. 5) which are threadedly connected with the ring 4. The adjusting ring 4 is rigidly connected with a coaxial ring gear 6 having an annulus of equidistant tooth spaces 6a (see particularly FIG. 5) serving to receive the tips of teeth 3b provided on and extending substantially tangentially of the knives 3. Thus, when the adjusting ring 4 is moved axially by the rods 5, the gear 6 automatically changes the angular positions of all knives 3 while the knives are caused to move radially inwardly (when the ring 4 is moved in the direction indicated by the arrow 12) or are free to move radially outwardly under the action of the leading end of a fresh workpiece 7.

Figure 5:
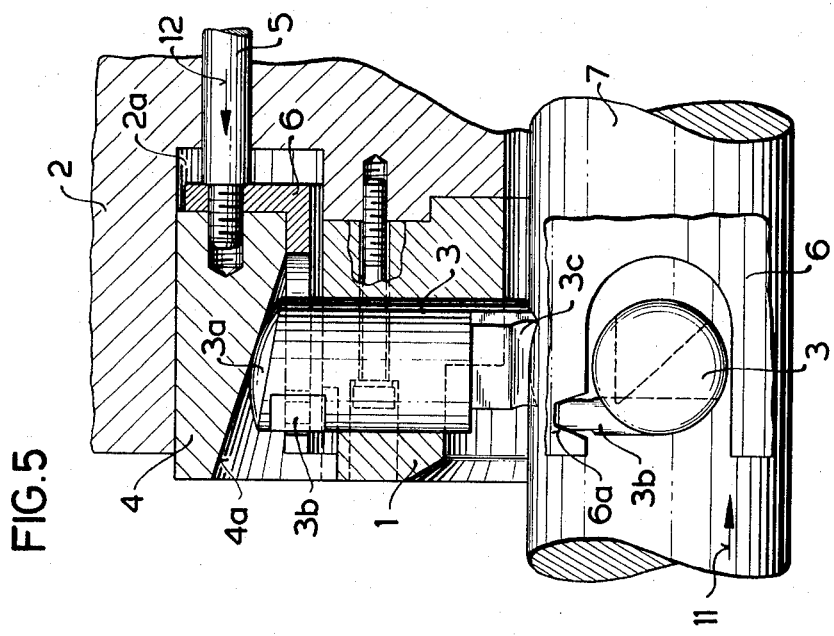
FIG. 5 is a fragmentary partly elevational and partly axial sectional view of a portion of the shaving apparatus as seen in the direction of arrows from the line V—V of FIG. 6.

Each knife 3 is provided with a concave cutting edge 3c which is located in a plane making an acute angle with the axis of the workpiece 7 (see particularly FIG. 5). The radius of curvature of the projections of cutting edges 3c into a plane which is normal to the axis of the holder 2 preferably equals the radius of the external surface of an average workpiece which is being treated in the shaving apparatus, and more particularly to the radius of the outer surface of a workpiece whose diameter is somewhere midway between the diameter of the largest and the diameter of the smallest workpiece capable of being treated in the apparatus of the present invention without necessitating a replacement of knives 3 with knives having cutting edges 3c with radii of curvature different from those of the illustrated knives.

Figure 2:
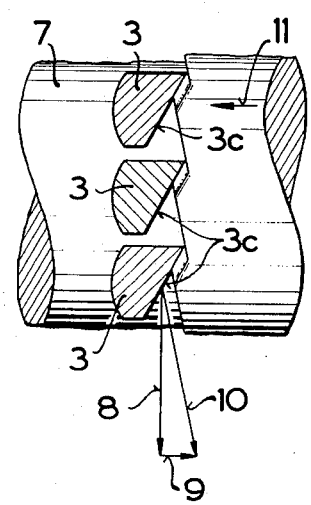
FIG. 2 is a fragmentary side elevational view of the workpiece and a sectional view of three knives as seen in the direction of arrows from the line II—II of FIG. 1, showing the removal of shavings while the knives orbit at the relatively high initial speed.
Figure 4:
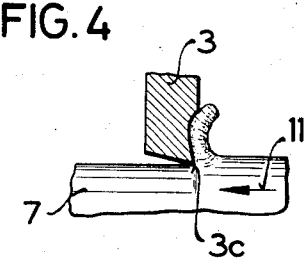
FIG. 4 is a fragmentary sectional view as seen in the direction of arrows from the line IV—IV of FIG. 3.

The operation is as follows:

To start the shaving of a fresh workpiece, the control unit 104 is caused to orbit the holder 2 and the knives 3 at a relatively high initial speed and the workpiece 7 is caused to move lengthwise at a relatively low speed. The high initial speed of orbital movement of the knives 3 is represented in FIG. 2 by the vector 8 and the relatively low speed of initial lengthwise movement of the workpiece 7 in the direction indicated by the arrow 11 is represented by the vector 9. The vector 10 is the sum of the vectors 8 and 9 and represents the cutting speed. It will be noted that the vector 10 which represents the cutting speed extends substantially radially of the workpiece 7.

Figure 3:
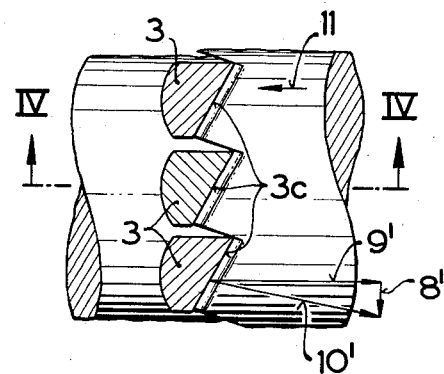
FIG. 3 illustrates the structure of FIG. 2 and the removal of shavings while the knives orbit at the relatively low operating speed.
Figure 6:
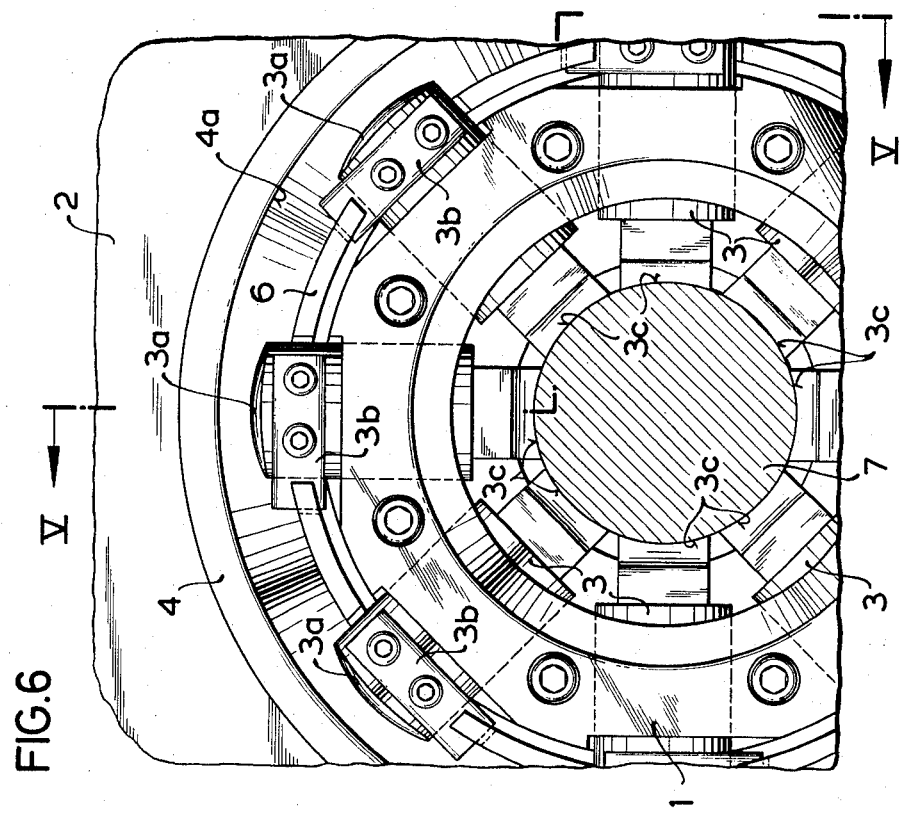
FIG. 6 is a fragmentary end elevational view of the shaving apparatus as seen from the left-hand side of FIG. 5.

The control unit 104 is thereupon caused to gradually reduce the speed of orbital movement of the knives 3 from the relatively high initial speed to a relatively low operating speed which is represented in FIG. 3 by the vector 8'. At the same time, the control unit 104 causes the feed rolls FR to advance the workpiece 7 at a gradually increasing speed until the workpiece 7 begins to move at the maximum rated speed which is indicated in FIG. 3 by the vector 9'. The vector 10' which is the sum of the vectors 8' and 9' again represents the cutting speed. The control unit 104 insures that the initial cutting speed equals the final cutting speed as well as that the cutting speed remains unchanged during gradual acceleration of the workpiece 7 in the direction indicated by the arrow 11 and simultaneous gradual deceleration of the holder 2 and knives 3 from the initial speed to the operating speed. The art is replete with control means which are capable of simultaneously controlling the speeds of two different elements in such a way that the vector representing the sum of vectors indicating the speeds of the elements remains unchanged. It will be noted that the vector 10' shown in FIG. 3 extends substantially axially of the rapidly moving workpiece 7. The term "gradual" as used in this description is intended to embrace stepwise changes in the speed of the holder 2 and workpiece 7 as well as continuous changes so that the deceleration of the holder 2 involves the driving of the holder at an infinite number of intermediate speeds and the acceleration of the workpiece 7 involves feeding the workpiece at an infinite number of intermediate speeds. As the speed of orbital movement of the holder 2 and knives 3 decreases from the initial speed to operating speed, the direction of the vector representing the cutting speed gradually changes from substantially radial (see the vector 10) to substantially axial (vector 10'). The operating speed (vector 8') of the knives 3 is preferably just high enough to insure that the cutting edges 3c overlap sufficiently to shave the entire external surface of the rapidly moving workpiece 7. As shown in FIGS. 2 and 3, the cutting edges 3c remove relatively narrow shavings 106 when the workpiece 7 is being fed at a low speed and much wider shavings 107 when the workpiece is caused to move at the maximum speed. The width of the shavings 107 at least approximates the width of the cutting edges 3c. It will be noted that the direction of the vector 10' shown in FIG. 3 nearly coincides with the direction indicated by the arrow 11 and that the cutting speed represented by this vector nearly equals the maximum speed of lengthwise movement of the workpiece (vector 9').

Figure 8:
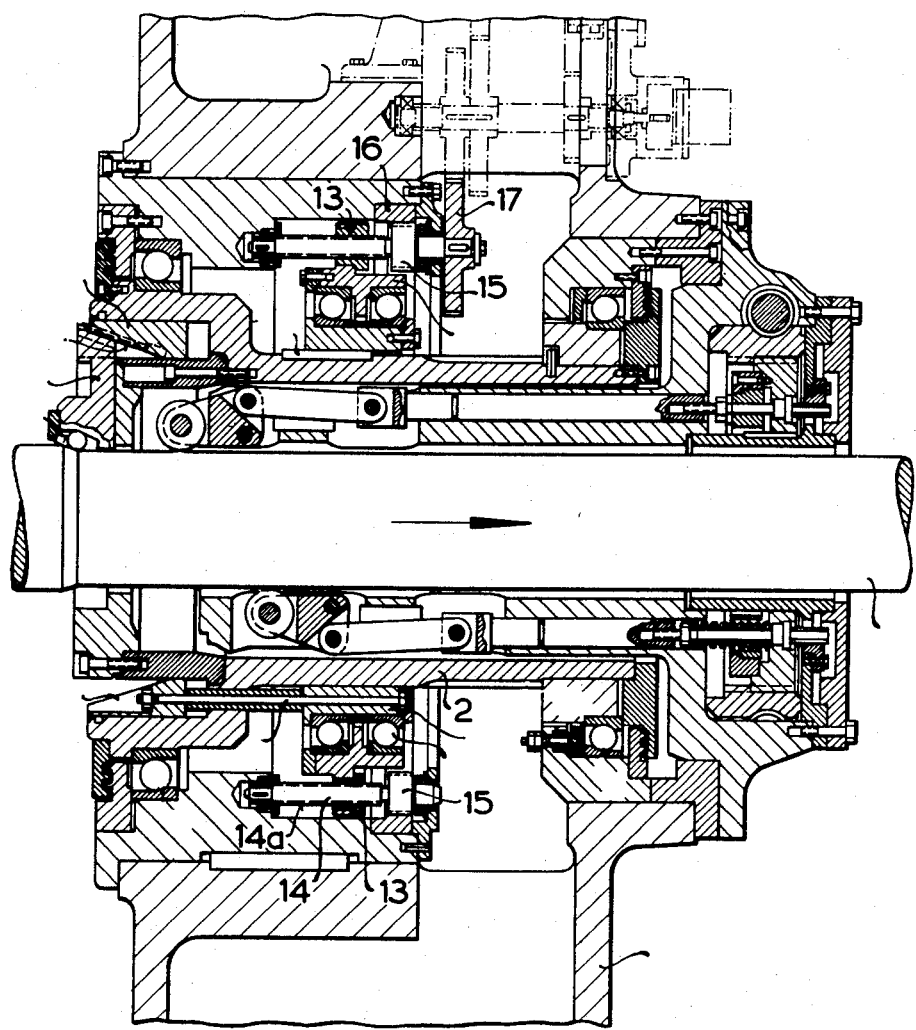
FIG. 8 is an axial sectional view of the shaving apparatus, showing the means for moving the knives radially of the workpiece.

If the positions of the knives 3 must be changed, either to compensate for eventual wear on the cutting edges 3c or to set up the apparatus for the shaving of workpieces having external diameters smaller than that of the illustrated workpiece, the knives 3 are moved radially inwardly by the conical surface 4a in response to axial movement of the adjusting ring 4 (arrow 12) under the action of the rods 5. At the same time, the gear 6 rotates the knives 3 about their respective axis due to the fact that the teeth 3b extend into the tooth spaces 6a of the gear 6 which shares all axial movements of the adjusting ring 4. The means for moving the rods 5 in order to move the ring 4 axially is shown in FIG. 8. The extent of axial and angular adjustment of each knife 3 is preferably the same. Angular movements of the knives 3 bring about changes in effective curvature of their concave cutting edges 3c, as considered in the direction of arrow 11. The extent of radial and angular adjustment of the knives 3 is limited by the permissible deviations of treated external surfaces from a cylindrical surface. Thus, when the angular positions of the knives 3 are changed by the gear 6, the effective curvature of the cutting edges 3c (as considered in the direction of movement of the workpiece) is not constant, i.e., the ideal cutting edges of constant radius of curvature from end to end will be changed to cutting edges which, when projected into a plane normal to the axis of the workpiece, will have an elliptical rather than a truly circular outline. The deviation from circular outline is more pronounced in response to more pronounced angular movement of knives 3 from their ideal angular positions in which the projections of their cutting edges into a plane which is normal to the axis of the holder 2 are portions of circles having radii corresponding to the desired radius of the finished workpiece.

An important advantage of the improved shaving method and apparatus is that the speed of lengthwise movement of workpieces can be increased in such a way that the final or maximum speed at least approximates the cutting speed, that the cutting speed remains unchanged during acceleration of workpieces, and that the cutting edges 3c are much less likely to undergo excessive wear and/or break during acceleration of the workpiece because the cutting speed remains constant during each stage of operation, i.e., not only during feeding at normal or rated speed but also during gradual acceleration of feed to such normal speed of the workpiece. The initial speed of orbital movement of the knives 3 is preferably their maximum speed. The holder 2 may be provided with resilient means serving to bias the follower portions 3a of the knives 3 against the conical surface 4a of the adjusting ring 4.

A suitable device for moving the ring 4 axially is disclosed in the commonly owned allowed copending application Ser. No. 193,858 filed Oct. 29, 1971 now U.S. Pat. No. 3,788,170 by Riedel. FIG. 8 is identical with FIG. 1 of the Riedel application and shows that the rods 5 are connected to the inner race 19a of an antifriction bearing 19. One or more keys 18 are provided to hold the inner race 19a against angular movement with reference to the holder 2; however, such keys allow the inner race 19a to move axially of the holder 2. The inner race 19a is movable axially of the holder 2 by means of the outer race 19b of the bearing 19. To this end, the outer race 19b carries a set of equidistant nuts 13 which mesh with the external threads 14a of axially parallel feed screws 14. Each feed screw 14 is rotatably mounted in the frame 20 but is held against axial movement with reference to the holder 2. The pinions 15 on the feed screws 14 mesh with an external gear 16 which is rotatably mounted in the frame 20. One of the feed screws 14 is further rigidly connected with a gear 17. The feed screws 14, the bearing 19, the internal gear 16, the gear 17 and the pinions 15 constitute component parts of a displacing device which serves to move the sleeve 4 axially of the holder 2. When the outer race 19b of the bearing 19 is caused to move axially and entrains the inner race 19a, the rods 5 shift the sleeve 4 with reference to the tools 3 whereby the tools move radially inwardly or outwardly, depending on the direction of axial movement of the sleeve 4.

The displacing device of the adjusting mechanism further comprises a prime mover, such as a variable-speed reversible electric motor mounted on the frame 20, which can rotate the gear 17 at several speeds.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. A method of shaving the circumferential surfaces of metallic wire, rods, tubes or analogous workpieces of generally circular profile by means of knives which orbit in a predetermined plane about a predetermined axis, comprising the steps of orbiting the knives at a relatively high initial speed and feeding a workpiece lengthwise in the direction of the axis at a starting speed so that the rapidly orbiting knives remove material at the circumferential surface of the moving workpieces at a predetermined cutting speed whose vector is the sum of vectors representing the relatively high initial speed of orbital movement of the knives and the starting speed of lengthwise movement of the workpiece; and gradually reducing said initial speed to a predetermined operating speed while simultaneously gradually increasing the speed of movement of the workpiece from said starting speed, so that the cutting speed remains unchanged during said gradual reduction of the initial speed and at said operating speed.

2. A method as defined in claim 1, further comprising the step of holding the workpiece against rotation during said lengthwise feeding thereof.

3. A method as defined in claim 2, wherein the vector representing said sum of vectors extending substantially radially of the workpiece while the knives orbit at said initial speed and substantially axially of the workpiece while the knives orbit at said operative speed.

4. A method as defined in claim 2, wherein the width of shavings which are removed by the orbiting knives increases in response to reduction of said initial speed.

5. In an apparatus for shaving the circumferential surfaces of metallic tubes, wire, rods or analogous workpieces of generally circular profile, a combination comprising driven feeding means for moving workpieces lengthwise so that the axes of moving workpieces coincide with a predetermined axis; a holder arranged to rotate about said axis; a plurality of knives secured to said holder and having cutting edges arranged to remove material along the circumferential surfaces of moving workpieces at a predetermined cutting speed while said knives orbit in response to rotation of said holder; and control means for gradually changing the speed of orbital movement of said knives from a relatively high initial speed to a relatively low operating speed while simultaneously gradually increasing the speed at which said feeding means moves the workpieces lengthwise so that said cutting speed remains unchanged due to the decrease in said orbital speed which is accompanied by the simultaneous increase in the speed of lengthwise movement of said workpieces.

6. A combination as defined in claim 5, wherein said knives are movable in said holder substantially radially of said axis and have follower portions remote from said axis, and further comprising adjusting means for moving said knives radially of said axis including an annular adjusting member movable axially in said holder and having a conical internal surface engaging with said follower portions, and means for moving said adjusting member axially of said holder.

7. A combination as defined in claim 6, wherein said apparatus is arranged to shave workpieces with external surfaces having radii within a range including an average radius, said cutting edges having a concave shape with a radius of curvature at least approximately said average radius.

8. In an apparatus for shaving metallic tubes, wires, rods or analogous workpieces of generally circular profile, combination comprising driven feeding means for moving workpieces lengthwise so that the axes of moving workpieces coincide with a predetermined axis; a holder arranged to rotate about said axis; a plurality of knives secured to said holder and having cutting edges arranged to remove material along the external surfaces of moving workpieces at a predetermined cutting speed while said knives orbit in response to rotation of said holder, said knives being movable in said holder substantially radially of said axis and having follower portions remote from said axis, and each of said knives being turnable in said holder about an axis which is substantially radial to said predetermined axis; adjusting means for moving said knives radially of said axis, including an annular adjusting member movable axially in said holder and having a conical internal surface engaging with said follower portion, means for moving said adjusting member axially of said holder, and means for turning said knives about their respective axes simultaneously with axial movement of said annular adjusting member; and control means for gradually changing the speed of orbital movement of said knives from a relatively high initial speed to a relatively low initial speed and for simultaneously increasing the speed of said feeding means so that said cutting speed remains unchanged.

9. A combination as defined in claim 8, wherein said means for turning comprises a ring gear arranged to move with said adjusting member axially of said holder and having a plurality of tooth spaces, and a tooth provided on each of said knives and extending into one of said tooth spaces.

10. A combination as defined in claim 9, wherein each of said teeth extends substantially tangentially of the respective knife.

11. In an apparatus for shaving metallic tubes, wires, rods or analogous workpieces of generally circular profile having external surfaces whose radii are within a range including an average radius, a combination comprising driven feeding means for moving workpieces lengthwise so that the axes of moving workpieces coincide with a predetermined axis; a holder arranged to rotate about said axis; a plurality of knives secured to said holder and having cutting edges arranged to remove material along the external surfaces of moving workpieces at a predetermined cutting speed while said knives orbit in response to rotation of said holder, said cutting edges having a concave shape with a radius of curvature at least approximately said average radius, said knives being movable in said holder substantially radially of said axis and having follower portions remote from said axis, and each of said knives being turnable in said holder about an axis which is substantially radial to said predetermined axis; adjusting means for moving said knives radially of said axis, including an annular adjusting member movable axially in said holder and having a conical internal surface engaging with said follower portion, means for moving said adjusting member axially of said holder, and means for turning said knives about their respective axes simultaneously with axial movement of said annular adjusting member; and control means for gradually changing the speed of orbital movement of said knives from a relatively high initial speed to a relatively low initial speed and for simultaneously increasing the speed of said feeding means so that said cutting speed remains unchanged.

* * * * *